United States Patent
Hudgings et al.

(10) Patent No.: US 8,408,786 B2
(45) Date of Patent: Apr. 2, 2013

(54) OPTICAL CHARACTERIZATION OF PHOTONIC INTEGRATED CIRCUITS

(75) Inventors: Janice A. Hudgings, South Hadley, MA (US); Rajeev J. Ram, Arlington, MA (US); Maryam Farzaneh, South Hadley, MA (US)

(73) Assignees: Massachusetts Institute of Technology (MIT), Cambridge, MA (US); Mount Holyoke College, South Hadley, MA (US)

( * ) Notice: Subject to any disclaimer, the term of this patent is extended or adjusted under 35 U.S.C. 154(b) by 423 days.

(21) Appl. No.: 12/115,201

(22) Filed: May 5, 2008

(65) Prior Publication Data

US 2009/0245322 A1 Oct. 1, 2009

Related U.S. Application Data

(60) Provisional application No. 60/916,079, filed on May 4, 2007.

(51) Int. Cl.
*G01K 3/00* (2006.01)
*G01K 1/00* (2006.01)
*G01K 11/00* (2006.01)

(52) U.S. Cl. ........ 374/137; 374/131; 374/120; 374/161; 374/124

(58) Field of Classification Search .......... 374/137, 374/131, 120, 161, 124
See application file for complete search history.

(56) References Cited

U.S. PATENT DOCUMENTS

| | | | |
|---|---|---|---|
| 6,921,195 B2 | 7/2005 | Pipe et al. | |
| 7,173,245 B2 | 2/2007 | Shakouri et al. | |
| 7,249,881 B2 | 7/2007 | Pipe et al. | |
| 7,641,395 B2 * | 1/2010 | Ringgenberg et al. | 385/53 |
| 2003/0146768 A1 * | 8/2003 | Kash et al. | 324/752 |
| 2003/0152132 A1 * | 8/2003 | Pipe et al. | 374/137 |
| 2005/0063453 A1 * | 3/2005 | Camm et al. | 374/161 |
| 2005/0084213 A1 * | 4/2005 | Hamann et al. | 385/40 |
| 2006/0153274 A1 * | 7/2006 | Seebacher | 374/130 |
| 2006/0274151 A1 | 12/2006 | Lueerssen et al. | |
| 2009/0084959 A1 * | 4/2009 | Hudgings et al. | 250/341.8 |

FOREIGN PATENT DOCUMENTS

WO WO-03/052366 6/2003

OTHER PUBLICATIONS

Hudgings et al, "Wafer scale profiling of photonic integrated circuits" Conference on Lasers and and Electro-Optics (CLEO) Jun. 1-6, 2003.
Farzaneh, et al., "Fiber-free Characterization of Photonic Integrated Circuits by Thermoreflectance Microscopy" Quantum Electronics and Laser Science Conference 2007, IEEEE May 6, 2007.
Partial International Search of PCT/US2008/062660 dated Oct. 7, 2008.
International Search Report and Written Opinion of PCT/US2008/062660 dated Jan. 7, 2009.

* cited by examiner

*Primary Examiner* — Mirellys Jagan
(74) *Attorney, Agent, or Firm* — Thomas J. Engellenner; Reza Mollaaghababa; Pepper Hamilton LLP

(57) ABSTRACT

In one aspect, the present invention provides techniques and apparatus for optical characterization of photonic devices and/or circuits. By way of example, the techniques can be used to identify damaged devices in photonic integrated circuits. In some embodiments, thermal imaging is employed as a diagnostic tool for characterizing the devices/circuits under investigation. For example, in one embodiment, integrated cascaded semiconductor amplifiers can be characterized using amplified spontaneous emission from one amplifier as a thermal modulation input to another amplifier. A thermoreflectance image of the second amplifier can reveal flaws, if present. Further, in some embodiments, thermal imaging in conjunction with a total energy model can be employed to characterize the elements of photonic circuits optically and/or to map the optical power distribution throughout the circuits.

15 Claims, 15 Drawing Sheets

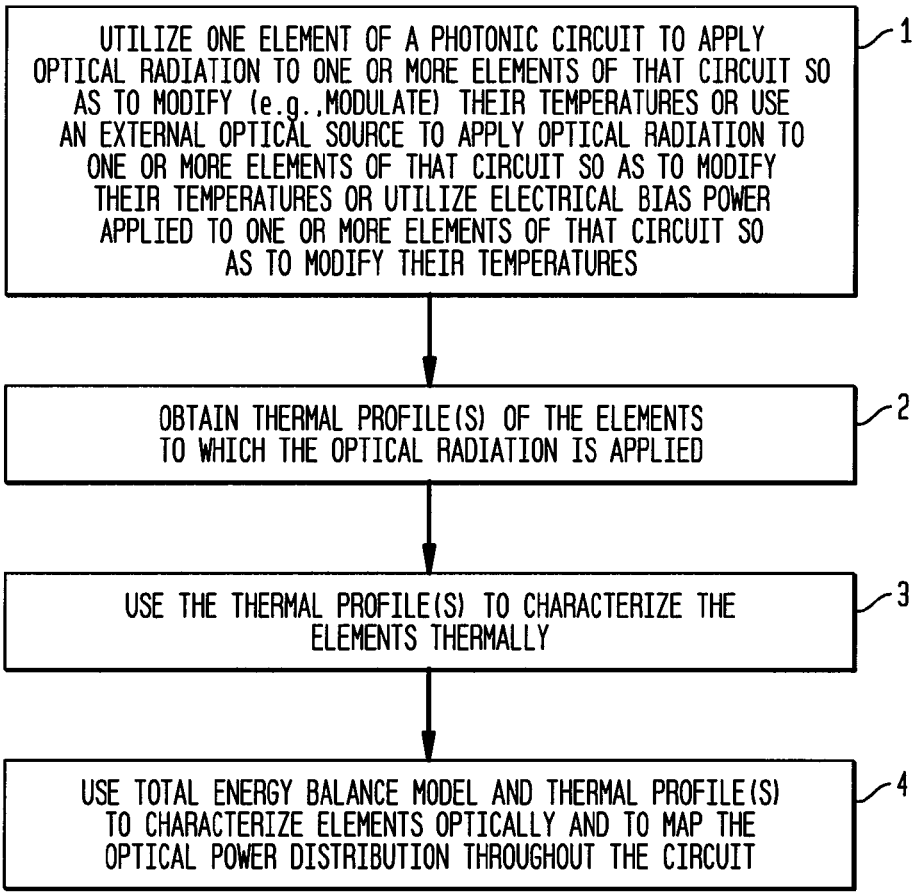
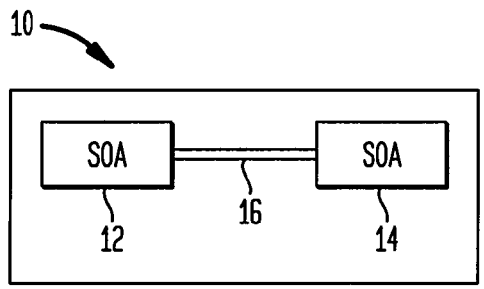

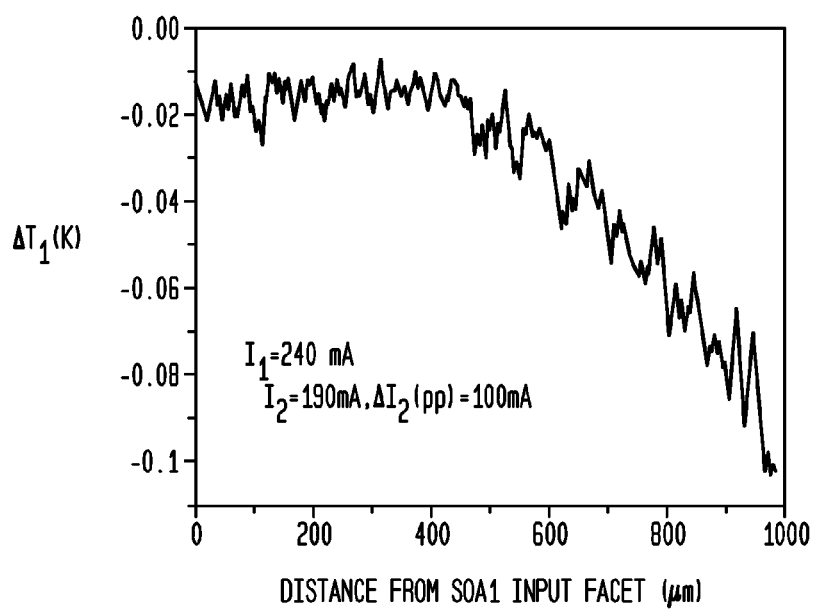
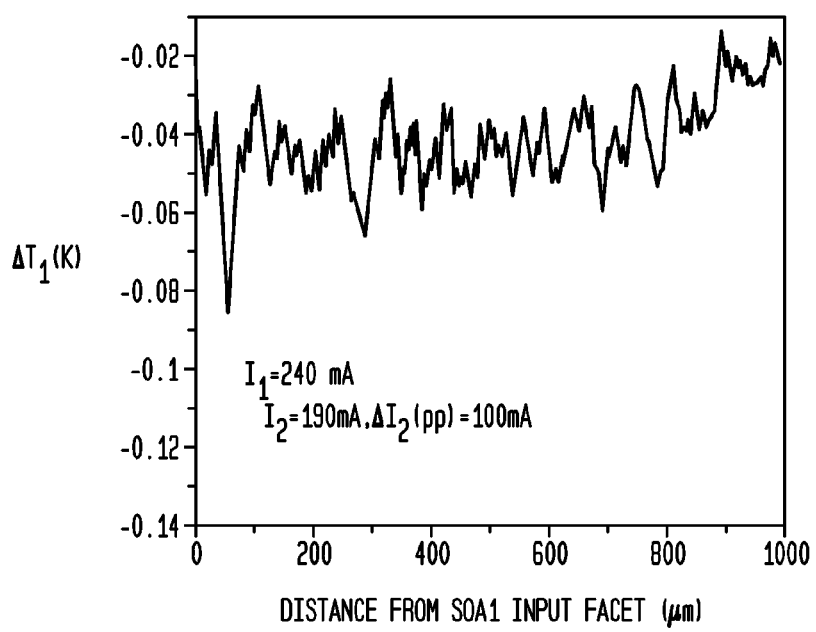

US 8,408,786 B2

OPTICAL CHARACTERIZATION OF PHOTONIC INTEGRATED CIRCUITS

RELATED APPLICATION

The present application claims priority to a provisional application entitled "Optical Characterization of Photonic Integrated Circuits," filed on May 4, 2007 and having a Ser. No. 60/916,079. The provisional application is incorporated herein by reference in its entirety.

FEDERALLY SPONSORED RESEARCH

This invention was made with Government Support under grant ECS-0134228 awarded By National Science Foundation (NSF). The Government has certain rights in the invention.

BACKGROUND

The present invention relates generally to methods and systems for characterizing devices, such as integrated optoelectronic circuits/devices, such as integrated photonic circuits.

Photonic integrated circuits (PICs) are increasingly employed in a variety of applications, such as optical fiber communication, wavelength division multiplexing, and optical signal processing. Monolithic integration of optoelectronic devices, such as amplifiers, waveguides, and splitters, into PICs render characterization of those devices difficult. Preferably, the device performance of individual elements in PICs should be tested at the wafer level, prior to packaging and fiber coupling. Although on-chip electrical measurements such as IV curves and photocurrent measurements can be used to identify catastrophic failures in individual devices on a PIC at the wafer level, such measurements fail to characterize material parameters of the devices under operating conditions and may also fail to identify certain defects and failures.

Accordingly, there is a need for enhanced methods and systems of characterizing devices, such as photonic integrated devices and circuits.

SUMMARY

The present invention relates generally to methods and systems for characterizing devices, such as integrated photonic devices and/or photonic integrated circuits (PICs). In many embodiments, thermal imaging, for example via thermoreflectance microscopy, is employed as a diagnostic tool to acquire—non-invasively—high resolution temperature image profiles of devices under testing, such as PICs under operating conditions. By way of example, such thermal imaging of PICs can be used to thermally characterize their circuit elements, as a diagnostic tool for failure analysis, to image hot spots, and to improve the thermal management of the chip. The thermal imaging can also be employed, with or without the use of a heat exchange model or a total energy balance model, to perform optical characterization of PICs and integrated photonic circuits including, without limitation: characterizing the optical performance of individual devices integrated into a PIC or otherwise cascaded together and to extract optical parameters of these devices; mapping the optical power distribution throughout a PIC, quantifying efficiencies or losses associated with waveguide splitters and couplers; quantifying fiber-coupling losses at the input and/or output of a PIC; extracting material parameters of devices on a PIC or to perform quality control or uniformity tests across a wafer or between wafers, and identifying failures and/or defects on a PIC or a wafer of PICs.

In some embodiments, the methods of the invention can be utilized to characterize the optical performance of photonic devices including, without limitation, quantifying: optical gain, optical absorption and/or loss, optical coupling loss, optical bending loss, optical splitting loss, non-radiative absorption, polarization dependent gain, saturation power, saturation length, optical interference ratios, optical feedback, internal optical power distributions, total optical output power, differential efficiency, optical efficiency, performance non-linearities, etc.

Although in many embodiments discussed below, various aspects of the invention are described in connection with PICs, the methods and systems of the invention have general applicability for characterizing a variety of devices, such as mixed combinations of electronic and photonic circuits or individual stand-alone devices.

In some embodiments, an on-chip light source (including but not limited to a laser, an LED, or amplified spontaneous emission (ASE) from a semiconductor optical amplifier (SOA) can be used as the optical source for characterization of the other cascaded optical elements on the chip (e.g., the radiation from the optical source can be applied to another element to modulate its temperature for performing thermal imaging on that element). For example, in some cases, modulated ASE from an on-chip SOA can be employed. Such an approach can provide certain advantageous as it can be utilized to characterize PICs or other cascaded optoelectronic devices at the wafer stage, prior to packaging or fiber-coupling. The use of thermal imaging according to various embodiments of the invention for fiber-free, wafer scale testing and characterization of PIC components prior to packaging and fiber coupling can reduce manufacturing costs.

In one aspect, a method of profiling a photonic integrated circuit is disclosed that includes utilizing an element of the integrated circuit (herein referred to as first element) as a radiation source to apply an optical signal to another element of the circuit (herein referred to as second element), where the optical signal can modify (e.g., modulate) the temperature of the second element. A temperature profile of the second element can then be obtained and used to characterize that element. By way of example, the characterization of the second element can include, without limitation, performing a defect/failure analysis, determining a performance metric associated with that element, characterizing or quantifying optical or thermal parameters of the element, mapping optical power distribution within that element, identifying hot spots, and/or measuring optical cooling effects.

In a related aspect, the spontaneous radiation generated by the first element (e.g., an SOA) can be used as the radiation for investigating the second element. The spontaneous radiation can be amplified (e.g., via application of an appropriate bias to the first element) and modulated (e.g., by modulating the bias) to cause a modulation of the temperature of the second element. In some cases, the first element can be a laser, a light emitting diode, or any other suitable radiation source incorporated in the integrated circuit.

In another aspect, in the above method, the temperature profile of the second element can be obtained by employing any of thermoreflectance imaging, single point thermoreflectance, an external or integrated thermocouple, scanning probe thermography, thermal radiation detection (e.g., via an infrared camera) or any other suitable measurement modality.

In another aspect, the invention provides a method of profiling a photonic integrated circuit, which comprises applying a varying optical input signal to the circuit so as to modulate the temperature of one or more of the circuit elements (such as waveguide splitters and couplers, SOAs, etc). A thermal profile of those elements can be obtained and utilized to characterize them. By way of example, the characterization of the elements can include, e.g., generating a map of power distribution in those elements, or determining efficiency and/or loss associated with those elements. In some cases, the photonic integrated circuit can include an input port for coupling to a fiber, which carries the input optical signals from a source to the circuit.

In a related aspect, in the above method, the thermal profile of the circuit elements can be employed, e.g., in conjunction with a heat/energy balance model, to predict the optical performance of the circuit, e.g., to predict an output optical power in response to an applied input power.

In another aspect, a method of profiling a cascaded optoelectronic circuit/device, such as an element in an integrated photonic circuit, is disclosed that includes applying a modulating electrical bias signal to one or more elements of the circuit, obtaining a thermal profile of those elements (e.g., by utilizing thermoreflectance measurements), and utilizing the thermal profile to characterize those elements, e.g., to determine electrical heating associated with those elements.

In another aspect, a method of characterizing an optoelectronic circuit is disclosed that includes applying modulated optical radiation to at least one element of the circuit so as to modulate that element's temperature, and obtaining a thermal profile of that element, e.g., by thermoreflectance microscopy or other suitable techniques. The thermal profile can then be employed to characterize that element. While in some cases, the optical radiation can be supplied by an external radiation source, in other cases, it can be supplied by an element of the optoelectronic circuit itself, e.g., by a laser or LED or by an SOA as amplified modulated spontaneous emission.

In another aspect, a method of characterizing a device (e.g., an optoelectronic device such as SOA or a device comprising a mixed combination of photonic and electronic circuits) is disclosed that includes modulating a temperature of at least a portion of the device, and generating a temperature profile of that portion of the device by performing temperature measurements at a plurality of spatial locations of the device. The temperature profile can then be employed to obtain at least one performance parameter of the device. The number of locations at which the temperature is measured is typically equal or greater than 10, or 20, or 100, e.g., in a range of about 100 to about 500, or in a range of about 100 to 1000. In some cases, the temperature measurements are made along an accessible surface of the device with a linear density of the points at which the measurements are made (i.e., number of points divided by the length of a device segment along which measurements are made) equal or greater than about 1 cm$^{-1}$, e.g., in a range of about 1 cm$^{-1}$ to about 1400,000 cm$^{-1}$ (e.g., 140,000 cm$^{-1}$).

In a related aspect, in the above method of characterizing the device, the temperature modulation can be achieved by applying, e.g., a modulated electrical bias signal, or a modulated optical radiation to the device. Alternatively, a substrate on which the device is disposed and with which it is in thermal contact can be heated or cooled to modify the temperature of the device. Further, in some cases, the temperature measurements can be performed by employing non-contact measurement techniques, such as thermoreflectance microscopy. Moreover, in some cases, the temperature profile can be generated by fitting the temperature measurements to one or more curves.

In another aspect, a method for determining the performance of a device is disclosed that comprises applying a modulated electrical bias power to the device to cause a modulated heating of at least a portion thereof while applying dc (unmodulated) optical input radiation to the device (e.g., an input radiation having a constant amplitude). The temperature profile of the heated portion can be measured by employing lock-in detection at a modulation frequency of the applied electrical bias. The temperature profile can then be utilized to obtain information regarding electrical heating characteristics of the device, e.g., whether the temperature profile corresponds to one expected for a functional device. Alternatively, a dc electrical bias can be applied to the device while applying a modulated optical input thereto. The temperature profile of at least a portion of the device can be measured by employing lock-in detection at a modulation frequency of the modulated optical input. The temperature profile can then be utilized to derive information about optical heating or cooling of the device. Such information can be useful, e.g., in determining whether a device is functional and/or determining various operating parameters of the device. For example, an optical amplifier is expected to exhibit optical cooling along a direction extending from its input facet to its output facet (due to light amplification). If such a cooling is not observed in an operating amplifier, the amplifier can be identified as faulty.

In another aspect, the invention provides a method of characterizing a device, which comprises measuring temperature at a plurality of spatial locations in at least a portion of the device, fitting the temperature measurements to one or more curves to generate a spatial temperature profile of that portion, and utilizing the temperature profile in an energy balance model, such as the model discussed below, to characterize at least one parameter of the device.

In another aspect, a method of characterizing a wafer is disclosed, where the wafer includes at least two devices integrated therein that are optically connected. The method comprises applying a modulated electrical bias to one of those devices to modulate spontaneous emission generated by that device, where the spontaneous emission is injected via the waveguide to the other device. The temperature at each of a plurality locations of the device receiving the spontaneous emission is measured, and the temperature measurements are utilized to characterize at least one operating parameter of that device. These steps can be performed at the wafer level, prior to packaging and fiber-coupling.

Further understanding of the invention can be obtained by reference to the following detailed description in conjunction with associated drawings, which are briefly discussed below.

BRIEF DESCRIPTION OF THE DRAWINGS

FIG. 1 is a flow chart depicting various steps in an embodiment of a method of the invention for characterizing an integrated photonic circuit, FIG. 2 schematically depicts a simplified integrated photonic circuit, FIG. 3 schematically depicts a system for performing thermoreflectance spectroscopy, FIG. 4 schematically depicts the use of thermocouple probe for measuring thermal profile of a PIC's surface, FIG. 5A schematically depicts an exemplary PIC having a plurality of SOAs.

DETAILED DESCRIPTION

Figure 3:
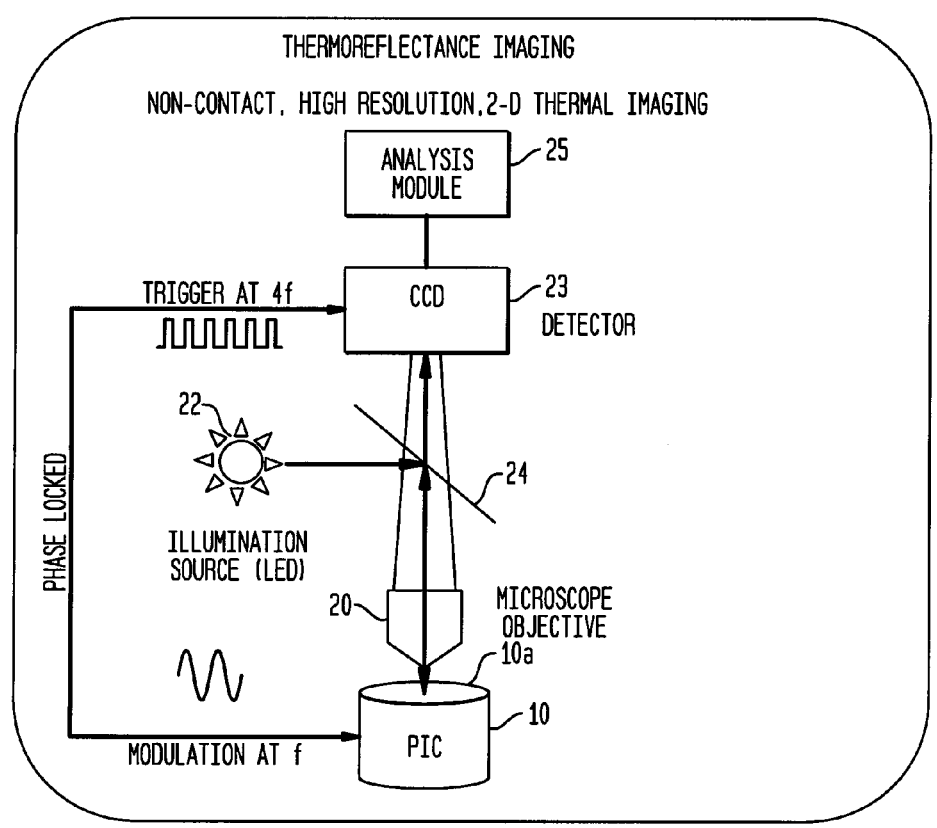

The present invention relates generally to methods and systems for characterizing devices, e.g., various circuit elements of photonic integrated circuits. By way of example, in some cases such characterization of a device comprises determining whether or not the device is faulty while in other cases it relates to quantifying one or performance parameters of the device. The performance parameters can include, without limitation, optical gain, optical loss, heating or cooling characteristics, among others. By way of example, in some embodiments, the temperature of a device under study can be modulated and a temperature profile of the device can be determined, e.g., by utilizing non-contact thermal measurement techniques (e.g., thermoreflectance imaging). The temperature profile can then be examined to determine whether the device is functional (e.g., by comparing the measured temperature profile with an expected profile for a functional device). In some other embodiments, a modulated optical signal can be applied to a device (e.g., an SOA) and the temperature profile along at least a portion of the device can be measured to determine whether expected cooling or heating effects, e.g., in response to amplification or absorption of the applied optical signal, are observed. In some other embodiments, various components of a wafer having integrated optoelectronic devices can be examined prior to coupling input and/or output optical fibers to the wafer by utilizing the spontaneous emission from at least one component to interrogate one or more other components that are optically coupled thereto.

With reference to flow chart of FIG. 1, in one embodiment of a method of the invention for profiling a photonic integrated circuit, one element of the circuit is utilized as a radiation source to apply radiation to one or more other elements of the circuit so as to modify (e.g., modulate) the temperature of those elements, or an external optical source is utilized to apply optical radiation to one or more elements of that circuit so as to modify their temperatures, or electrical bias power applied to one or more elements of that circuit is utilized so as to modify their temperatures (step 1). A thermal profile of one or more of those element(s) can be obtained (step 2) and that profile can be utilized to characterize those element(s) (step 3). Such characterization can include, without limitation, a defect/failure analysis, determining one or more operating parameters (e.g., optical gain or loss) of those elements, or obtaining a map of optical power distribution within those elements. Further, in some cases, an energy balance model and the thermal profiles can be employed to characterize elements optically and/or to map the optical power distribution throughout the circuit (step 4).

By way of example and further illustration, with reference to FIG. 2, such a method can be employed to profile a hypothetical photonic integrated circuit 10 that includes two cascading semiconductor optical amplifiers (SOAs) 12 and 14, which are optically coupled to one another via an optical waveguide 16. It should be understood that the circuit 10 is presented only for illustrative purposes and the complexity of integrated photonic devices (including the number of their elements) is generally much greater than shown here. Nonetheless, various features of the invention discussed here can be readily applied to such integrated photonic devices/circuits. Spontaneous emission generated by one of the SOAs (e.g., SOA 12 in this example) can be amplified and modulated, e.g., via modulating a bias current applied to the SOA 12, to generate modulated radiation. The modulated radiation can then be applied, via the waveguide 16, to the other SOA 14. The modulated radiation applied to the SOA 14 can in turn modulate the temperature of that SOA. A temperature profile of a surface of the SOA 14 (e.g., a surface accessible to a temperature probe) can then be determined by utilizing a variety of techniques, such as thermoreflectance microscopy, thermocouple temperature measurement techniques, scanning probe thermography, infrared imaging, etc.

In many embodiments, a temperature profile is compiled by obtaining the temperature at a plurality of points (e.g., a plurality of points along a surface of a device). The number of points can vary, e.g., based on a desired temperature resolution, the capabilities of a measurement system utilized, etc. In many embodiment, the temperature values at a few hundred points (e.g., in a range of about 100 to 1000) are determined by utilizing the above methods—though in some cases obtaining the temperature values at fewer points can be sufficient. Such discrete temperature measurements can be fitted to one or more continuous curves to generate a temperature profile.

By way of illustration, in this exemplary embodiment, thermoreflectance microscopy can be employed to obtain a two-dimensional thermal profile of a surface of SOA 14, which is biased at a dc current level. More particularly, thermoreflectance microscopy can measure the normalized change in surface reflectivity $$\left(\frac{\Delta R}{R}\right)$$

due to modulation of surface temperature ($\Delta T$):

$$\Delta T = \left(\frac{1}{R}\frac{\partial R}{R}\right)^{-1}\frac{\Delta R}{R} = \kappa^{-1}\frac{\Delta R}{R} \qquad \text{Eq. (1)}$$

where, $\kappa$ is the thermoreflectance calibration coefficient, which can depend on the material and wavelength.

For example, with reference to FIG. 3, a microscope 20 can focus light, generated by a light source 22 (e.g., a light emitting diode) and directed to the microscope via a beam splitter 24, onto a surface 10a of the PIC 10, and a CCD camera 23 can detect the light reflected from the surface. As the temperature of the surface of SOA 14 is modulated via the applied modulated amplified spontaneous radiation from the SOA 12, a lock-in technique at the modulating frequency can be employed for the detection of reflected light by the CCD camera. The image generated by the CCD camera can then be utilized to obtain a two-dimensional temperature profile of the surface of the PIC, including that of a surface of the SOA 14 and/or the waveguide 16. Further details regarding methods and systems for thermoreflectance microscopy suitable for use in the practice of the invention can be found, e.g., in Published U.S. Patent Application No. 2006/0274151 entitled "High Performance CCD-Based Thermoreflectance Imaging Using Stochastic Resonance," having a application Ser. No. 11/376,722, which is herein incorporated by reference.

Figure 4:
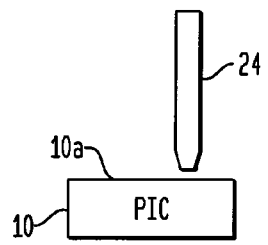

In other embodiments, measurement techniques other than thermoreflectance microscopy can be utilized to measure a temperature profile of the PIC, including that of the SOA 14 and/or the waveguide 16. Some examples of such techniques include, without limitation, thermal imaging (e.g., via an infrared camera), scanning probe thermography, or the use of a thermocouple. For example, with reference to FIG. 4, an external thermocouple 24 can be scanned over the surface 10a of the PIC 10 to measure temperature variations over that surface, including temperature variations associated with a surface of the SOA 14 and/or the waveguide 16. Moreover, the temperature profile of SOA 12 itself can also be measured.

In other implementations, the temperature measurements can be performed by thermisters, e.g., integrated thermisters, integrated circuit (IC) temperature sensors, RTD (resistive temperature device) sensors, either of which can be used as external sensors or integrated on a chip. Another thermal profiling technique that can be utilized is commonly known as "3 omega."

As noted above, in some embodiments, the measurement of the temperature profile can be accomplished by measuring the temperature at one or more discrete points (typically, the temperature is measured at tens or hundreds of points, e.g., up to about 3000 points) and the measurements are fit to semi-continuous curves. Such construction of a temperature profile can advantageously improve accuracy of the determination of various performance metrics of a device under study and allow the measurement of operating parameters such as saturation length, total optical absorption, an input optical power, among others. Further, the linear density of points at which temperature measurements are made can be, e.g., in a range of $1\text{ cm}^{-1}$ to about $1{,}400{,}000\text{ cm}^{-1}$, or in a range of $1\text{ cm}^{-1}$ to about $140{,}000\text{ cm}^{-1}$. The above numerical values are provided for illustrative purposes. The teachings of the invention can also be implemented by employing temperature measurements at a number of discrete points and/or a linear density of temperature measurements that lie outside the above ranges.

Further, in some thermal measurement techniques (e.g., IR camera, scanning probe thermography, etc) temperature modulation is not necessary—though it may be utilized in some cases. In some embodiments utilizing such measurement techniques, optical and/or electrical signals can be employed to modify the temperatures of one or more circuit elements without necessarily causing a temperature modulation. For example, a DC bias voltage can be applied to a circuit, or an external cooler/heater can be utilized to cause the temperature of at least a portion of a circuit element (e.g., an external optical beam can be employed to heat the element). In some cases, radiation emitted by an antenna (e.g., an antenna integrated in a PIC or an external antenna) can be employed to cause heating of one or more devices.

Figure 5A:
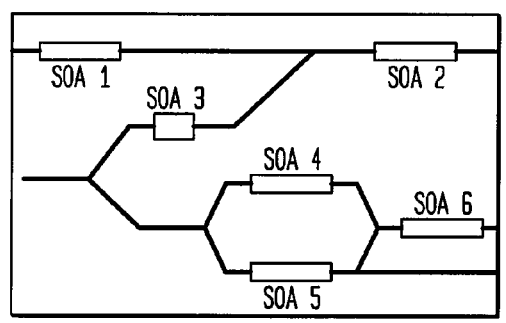
FIG. 5B depicts a measured temperature profile along a ridge of a functioning SOA1 of a PIC having the layout shown in FIG. 5A, which is obtained by utilizing a method according to an embodiment of the invention.
FIG. 5C depicts a measured temperature profile along a ridge of a defective SOA1 of a PIC having the layout shown in FIG. 5A, which is obtained by utilizing a method according to an embodiment of the invention.

The measured temperature profile can then be employed as a diagnostic tool to characterize one or more circuit elements under investigation (e.g., SOA 14 and/or waveguide 16 in this example). For example, such a temperature profile can be utilized to determine whether a circuit element is damaged. By way of illustration, FIG. 5A shows a temperature profile along a ridge of an SOA 1 in a photonic integrated circuit (the circuit layout is depicted in the insert of the figure, but this technique is not limited to that layout) measured by a method according to one embodiment of the invention (the circuit layout and the measurement methods are described in more detail Example 4 below). More specifically, the plot of FIG. 5B shows a drop in the temperature along the ridge due to optical cooling, with an approximate 100 mK drop at the output facet of the SOA 1 relative to its input facet. The observed optical cooling indicates that the SOA under investigation is not damaged. By contrast, a temperature plot shown in FIG. 5C for a damaged SOA 1 on another chip with the same layout indicates a lack of optical cooling along the length of the SOA 1 (no decrease in temperature is observed as a function of increasing distance from an input facet of the SOA 1). The lack of optical cooling in turn confirms that the SOA 1 provides no amplification of the input optical signal because either it or a waveguide interconnect coupling it to an on-chip radiation source is damaged—though no unusual behavior is detected from a standard IV curve.

Figure 6:
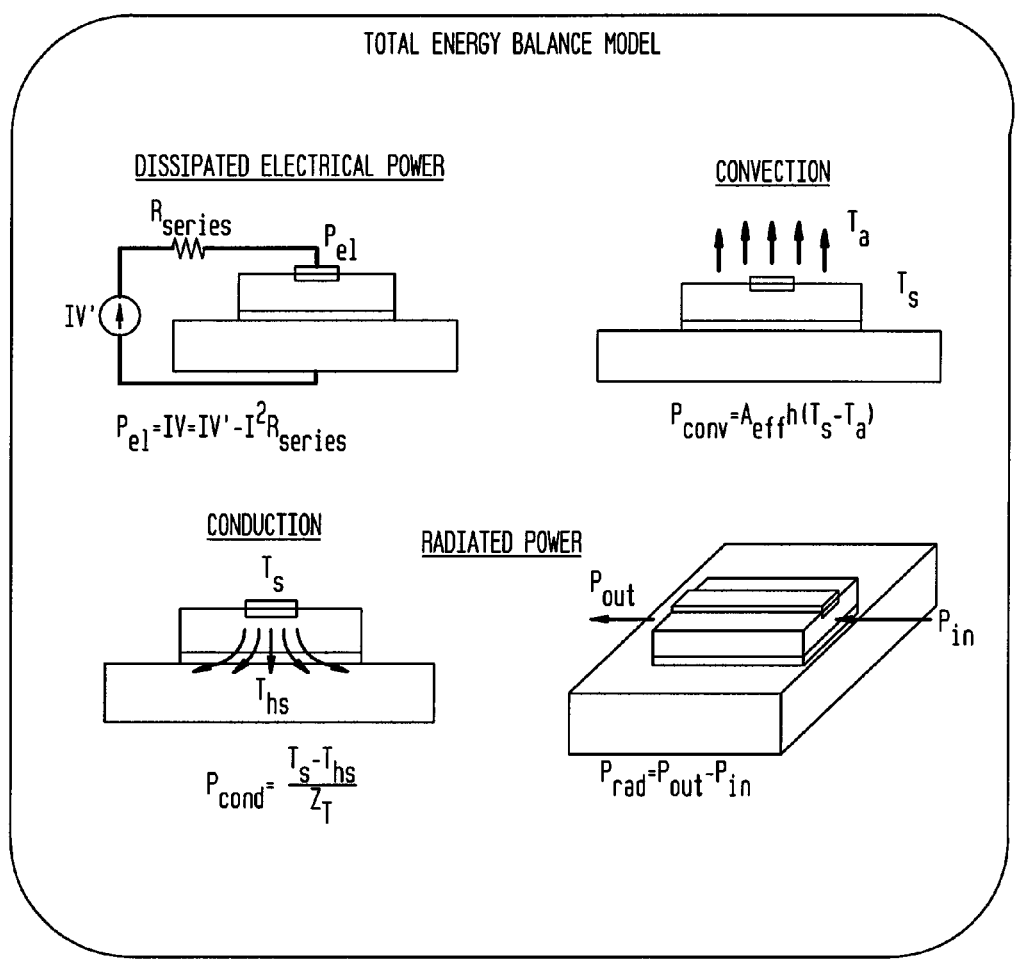
FIG. 6 presents various components of a total energy model suitable for use in some embodiments of the invention, FIG. 7 schematically depicts a PIC with an LED source as one of its elements, FIG. 8 schematically depicts a PIC receiving optical radiation from an external source, FIG. 9 schematically depicts a PIC having two SOAs that are optically connected via a waveguide, FIG. 10 schematically depicts a PIC having an SOA to which an electrical bias is applied and which receives optical radiation from an external source, FIG. 11 schematically depicts a PIC comprising a plurality of cascaded SOAs in which changes in surface temperature of the SOAs due to electrical heating was measured by thermoreflectance microscopy.

In other applications, the thermal profile of a circuit element can be employed, e.g., in conjunction with an energy balance model, to quantify one or more performance parameters of one or more circuit elements. By way of example, FIG. 6 shows various components of a total energy balance model, which can be used for this purpose. An example of such a model is described in U.S. Pat. No. 6,921,195 entitled "Method And Apparatus For Characterization Of Devices And Circuits," which is herein incorporated by reference.

In some embodiments, a finite element energy balance model can be used to describe the heat exchange mechanisms and thermal profile of one or more component devices under study. By way of example, for a differential element of length $\delta x$ at position $x_i$ along the length of a circuit element (e.g., an amplifier or absorber), a model representing vertical heat conduction between a surface of a circuit element at temperature $T_s$ and a heat sink at a temperature $T_{hs}$ with an effective thermal impedance $Z_T$ can be written as:

$$P_{el}\frac{\delta x}{L} = \frac{dP_{rad}(x_i)}{dx}\delta x + \left[\frac{T_s(x_i) - T_{hs}}{Z_T}\right]\frac{\delta x}{L} + [A_{eff} \cdot h(T_s(x_i) - T_a]\frac{\delta x}{L} \quad \text{Eq. (2)}$$

wherein convection from the surface plane with an effective area $A_{eff}$ with a convection coefficient h is described by the third term on the right, and wherein L denotes the length of the circuit element, $P_{el}$=IV denotes the electrical power, $P_{rad}$=$P_{out}$−$P_{in}$ denotes the radiated optical power defined as the difference between the output ($P_{out}$) and input ($P_{in}$) optical powers (where $P_{rad}$ is positive for an amplifier and negative for an absorber), and $T_a$ represents the ambient temperature, which can be taken to be constant. The effects of lateral heat conduction are neglected in the above exemplary model, as the lateral thermal impedance can be considerably larger than $Z_T$.

A modulation of the surface temperature ($\Delta T_s$) caused, e.g., as result of modulating the electrical power by $\Delta P_{el}$ or the radiated power by $\Delta P_{rad}$ at a give frequency (f) can be detected, e.g., by employing thermoreflectance imaging. By taking the change in the heat sink temperature to be proportional to the change in the surface temperature ($\Delta T_{hs}$=r$\Delta T_s$, where r is a proportionality constant) and incorporating the relevant modulations in the above Eq. (2), the exemplary energy balance model in its general form, after integration over the length of the circuit element, can be written as:

$$\Delta P_{el} = \Delta P_{rad}^{(t)} + \frac{c}{L}\int_0^L \Delta T_s(x)dx \quad \text{Eq. (3)}$$

wherein, $\Delta P_{rad}^{(t)}$=$\Delta P_{out}$−$\Delta P_{in}$ represents the total change in radiated optical power along the circuit element's length, $$c = A_{eff} \cdot h + \frac{1-r}{Z_r}$$

represents a constant relating convection and conduction terms in the above Eq. (3).

In the case of electrical heating with no optical injection, the total radiated power $\Delta P_{rad}^{(t)}$=0, and the above Eq. (3) can be written as:

$$\Delta P_{el} = \frac{c}{L}\int_0^L \Delta T_s^{el}(x)dx \quad \text{Eq. (4)}$$

where $\Delta T_s^{el}$ represents change of the surface temperature due electrical heating, and the other terms were defined above. $\Delta T_s^{el}(x)$>0 represents the change in surface temperature of the circuit element at position x along its length due to electrical heating.

In another case in which the electrical bias is fixed ($\Delta P_{el}$=0), and the optical input power is modulated, the above Eq. (3) can be rewritten as:

$$\Delta P_{rad}^{(t)} = \Delta P_{out} - \Delta P_{in} = -\frac{c}{L}\int_0^L \Delta T_s^{opt}(x)dx \quad \text{Eq. (5)}$$

where $\Delta T_s^{(opt)}$ represents the change in surface temperature of the circuit element due to optical heating. By way of example, in the case of an operating SOA, $\Delta T_s^{(opt)}(x)$<0 can indicate a local decrease in the surface temperature due to amplification of a modulated optical signal. If the SOA is maintained unbiased under optical injection, it acts an absorber with $\Delta T_s^{opt}(x)$>0, resulting in a negative $\Delta P_{rad}^{(t)}$.

By way of example, the above finite element energy balance model can be used to map optical power—based on a measured thermal profile—along the length of an SOA of a photonic integrated circuit whose layout is shown in FIG. 5A, although the application of the methods of the invention is not limited to this particular circuit layout. By way of another example, modal gain of SOA 14 ($g_{ASE}$) corresponding to the broadband ASE injection from SOA 12 can be derived from exponential fit to the following optical power relation:

$$\Delta P_{out}(x) = \Delta P_{in}e^{gx} \quad \text{Eq. (6)}$$

where x denotes the distance along SOA 14. By way of example, in one set of illustrative measurements discussed in more detail below in Example 3, at I=220 mA, $g_{ASE}$ was derived for an SOA, to which optical radiation from another SOA was applied, to be 20.5 cm$^{-1}$. This value is in good agreement with a spectrally averaged narrowband gain (<g>) of 24.1 cm$^{-1}$, which was measured via external optical injection.

The above method of profiling a photonic integrated circuit provides a number of advantages. For example, it provides a non-contact, high-resolution method for analyzing photonic integrated circuits, before packaging and fiber coupling, both to diagnose element defects/failures, e.g., as a complementary method to photocurrent measurements, and also to derive material parameters, such as modal gain.

Figure 7:
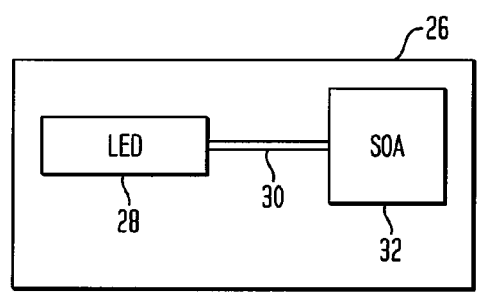

While in the above embodiment, the spontaneous radiation generated by one element of an integrated circuit was employed to modulate the temperature of another element, in other embodiments in which the integrated circuit includes an active light source, such as a light emitting diode (LED) or a laser, the radiation from that light source can be applied to other elements of the circuit in order to modify (e.g., modulate) their temperatures. By way of example, FIG. 7 schematically depicts a photonic integrated circuit 26 that includes an LED 28, which is optically coupled, via an optical waveguide 30 to an SOA 32. The radiation from LED 28 can be modulated, e.g., by electrically modulating a bias voltage applied to the LED, and the modulated radiation can be applied to the SOA 32 to modulate its temperature. A thermal profile of the SOA 32, e.g., a one or two-dimensional thermal profile of an accessible surface of the SOA 32 can then be obtained, e.g., in a manner discussed above. Such a thermal profile can be used to characterize that SOA, e.g., in a manner discussed above.

Figure 8:
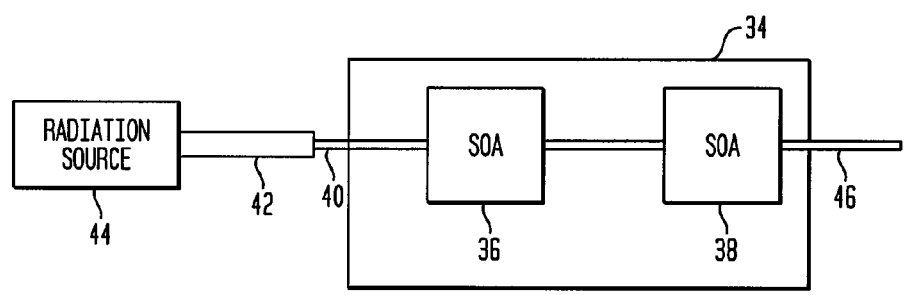

In other embodiments, optical radiation from an external source can be injected into a PIC and thermal profiling of one or more circuit elements of the PIC can be utilized for their characterization. By way of example and further illustration, FIG. 8 schematically depicts a hypothetical PIC 34 that comprises two cascading SOAs 36 and 38. The PIC further includes an input port that can be coupled via a fiber 42 to an external radiation source 44 and an output port 46, which can couple the PIC's output signal to other devices. In some embodiments, modulating optical radiation from the external source can be applied to the SOAs to modulate their temperatures, and thermal profiles of one or both of those SOAs can be obtained. By way of example, thermoreflectance microscopy can be employed (e.g., in a manner discussed above) to measure the thermal profile of a surface of one or both of the SOAs and/or the waveguide connecting them. The thermal profile can then be utilized to obtain information regarding the SOAs and/or the waveguide, e.g., whether they are damaged. Moreover, such a thermal profile can be used, e.g., in conjunction with a heat exchange and/or a total energy balance model, to obtain the material parameters of the SOAs, e.g., in a manner discussed above and in the attached appendices.

Figure 9:
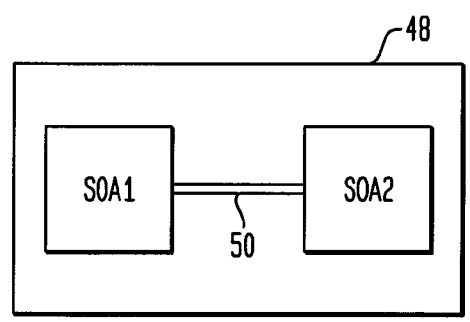

In some cases, the methods of the invention can be employed together with known photocurrent measurements to extract certain performance parameters of a circuit element. For example, FIG. 9 schematically depicts a PIC 48 having two SOAs (SOA1 and SOA2) that are optically connected via a waveguide 50 such that it transmits light emitted by SOA1 to SOA2. In some cases, the loss exhibited by the waveguide (e.g., bending loss and/or coupling loss) when it transmits light between the SOAs can be quantified in the following way. The thermal imaging techniques of the invention can be employed to quantify the amount of light emitted by the SOA1 and received by the waveguide. The amount of light reaching the downstream SOA2 can in turn be determined by employing traditional photocurrent measurements. In this manner, the optical power input into the waveguide can be determined via thermal measurements and the optical power at the output of the waveguide can be determined via photocurrent measurements. The input and output powers can then be utilized to calculate the waveguide loss (e.g., the ratio of the difference between input and output powers relative to the input power can provide the percentage loss exhibited by the waveguide).

In some cases, an operating PIC can be electrically pumped, with or without optical injection, which can cause electrical heating in its elements. Thermal profiling of such electrical heating, e.g., via thermoreflectance spectroscopy, can then be utilized as a diagnostic tool. For example, with reference to FIG. 8, in the PIC 10, one or both SOAs can be biased by modulating electrical signals (e.g., by applying a sinusoidal bias current at 10 Hz) with or without injecting optical radiation into the PIC. Such modulating electrical signals can in turn cause modulation of the temperature of the SOA. A thermal profile of the SOA can then be obtained, e.g., in a manner discussed above, and utilized to derive information about the SOA.

In some embodiments, the temperature profiles (thermal maps) can be employed to determine electrical performance of various devices (e.g., PICs) including, without limitation, electrical heating, current spreading, non-uniform currents flowing through a device or its contacts, current confinement, etc. For example, thermoreflectance spectroscopy can be employed to determine can be employed to distinguish between electrical heating and radiative optical heating or cooling, e.g., while selectively applying either modulated optical signals or modulated electrical bias signals. By way of example, thermoreflectance microscopy can be utilized via locking onto a modulated electrical bias power to investigate electrical heating of the devices, and via locking onto a modulated optical signal in order to investigate radiative heating or cooling. For example, an electrical power bias applied to a device can be modulated to cause modulated electrical heating while a dc optical input (e.g., optical radiation with constant amplitude) is applied to the device. A thermoreflectance lock-in detection (or other techniques for measuring temperature with lock-in detection) can be utilized at the modulation frequency of the electrical bias to distinguish electrical heating characteristics of the device from its optical heating characteristics.

Figure 10:
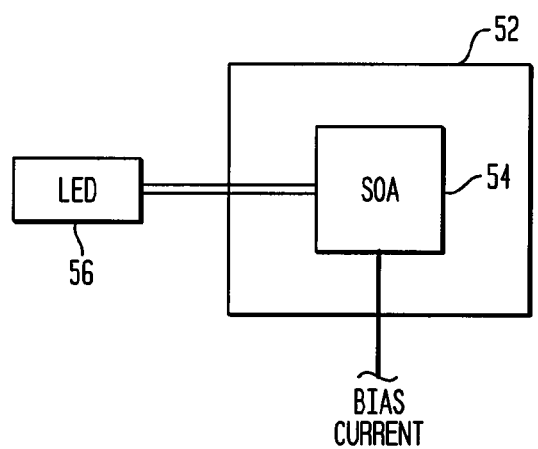

For example, FIG. 10 schematically depicts a PIC 52 having an SOA 54 to which a modulated electric bias (e.g., a modulated current) is applied. An external radiation source 56 (e.g., an external LED) applies a DC optical signal (e.g., an optical signal having constant amplitude) to the SOA. The thermal profile of the SOA (e.g., an accessible surface thereof) can be determined. By way of illustration, the thermal profile can be utilized to determine whether or not the SOA is faulty (e.g., whether there is a catastrophic device failure). For example, if the measured temperature profile is not consistent with a profile expected for a properly functioning SOA, then the SOA 54 can be identified as faulty. Other examples of information that can be gleaned from the thermal profile include, without limitation, various thermal parameters of the device, e.g., thermal impedance Z, heat transfer coefficient h, thermal conductivity, and/or uniformity of the current injection.

Alternatively, the optical input to a device can be modulated while applying a DC power bias to the device. For example, referring again to FIG. 10, rather than applying a modulated electrical bias, a DC electrical bias (in this case a DC bias current) can be applied to SOA 54 while the optical input from the LED 56 into the SOA can be modulated (e.g., amplitude modulated). Again, a thermoreflectance lock-in detection can be employed to detect temperature variations (thermal profile) due to optical heating/cooling independently of temperature signature of the DC bias. The thermal profile can be utilized to obtain information about the device. Some examples of the information that can be derived from the thermal profile include, without limitation, gain per unit length or absorption per unit length exhibited by the device, fiber input coupling efficiency (e.g., efficiency at the input of a PIC), waveguide losses, and device failure. For example, when amplifying an optical signal, a properly functioning SOA exhibits a drop in temperature along a direction in which the optical signal propagates. If the measured profile does not exhibit such a cooling effect, the SOA under test can be identified as faulty. In this manner, electrical heating and optical heating/cooling signatures can be independently determined, thus allowing enhanced understanding of the electrical and optical performance of a device.

The methods of the invention for characterizing the performance of a circuit element, such as the methods discussed above, can be implemented by utilizing amplitude and/or phase signatures of the thermal measurements. By way of example, a 180 degree phase shift in the phase of the surface temperature between different points on a surface of a circuit element can indicate a shift from heating to cooling (or vice versa) between the points, which can correspond, e.g., to a change from optical absorption to emission (or vice versa).

The applications of the methods and apparatus of the invention are not limited to characterizing integrated photonic circuits. In other embodiments, the methods and apparatus of the invention, such as those discussed above, can be employed to characterize mixed combinations of photonic and electronic circuits, as well as stand-alone devices, or elements cascaded by employing techniques other than integration (e.g., elements cascaded via one or more optical fibers).

As discussed above, the methods of the invention can be implemented in a variety of ways. In some embodiments, an analysis module configured to derive a temperature profile of a device under study can be in communication with a temperature sensor to receive the temperature measurements. The analysis module can be configured, e.g., in hardware and/or software, to operate on the temperature measurements to generate one or more temperature profiles and to utilize the temperature profiles to derive one or more performance parameters of a device under study, such as those discussed above.

Referring again to FIG. 3, in some embodiments, an analysis module 25 receives image of the CCD detector and analyzed those image to generate a temperature profile of the surface of the PIC 10. In addition, the analysis module can be configured to utilize the temperature profile, with or without an energy balance model, to obtain one or more performance parameters of the PIC 10, such as those discussed above (e.g., whether PIC include a faulty device, or the material gain of an SOA).

The following examples are provided to further elucidate various aspects of the invention. The examples are presented only for illustrative purposes and are not intended to necessarily indicate optimal results that can be obtained by employing the methods of the invention.

EXAMPLE 1

Figure 11:
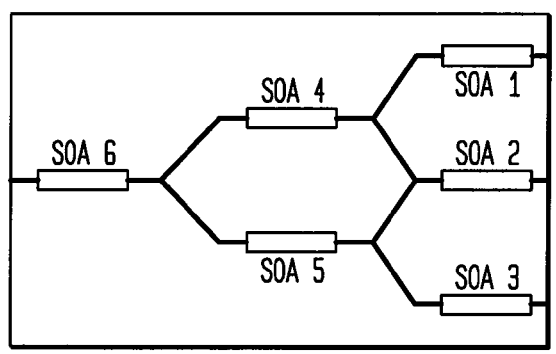

The changes in surface temperatures of five SOAs of a PIC chip, which included six cascaded SOAs and waveguide interconnects, due to electrical heating were measured by thermoreflectance microscopy. FIG. 11 schematically shows the layout of this PIC 58. The bias currents applied to the SOAs were modulated at f=15 Hz around a dc value $I_0$ by an amount $\Delta I$. For SOAs 2 and 6, a bias current density ($I_0$/L) of 55 A/m was utilized while the bias current density for SOAs 1, 3, and 4 were respectively 83 A/m, 28 A/m, and 25 A/m. The SOAs 4 and 5 are about 2 mm long the other SOAs are each 1 mm in length.

Figure 12:
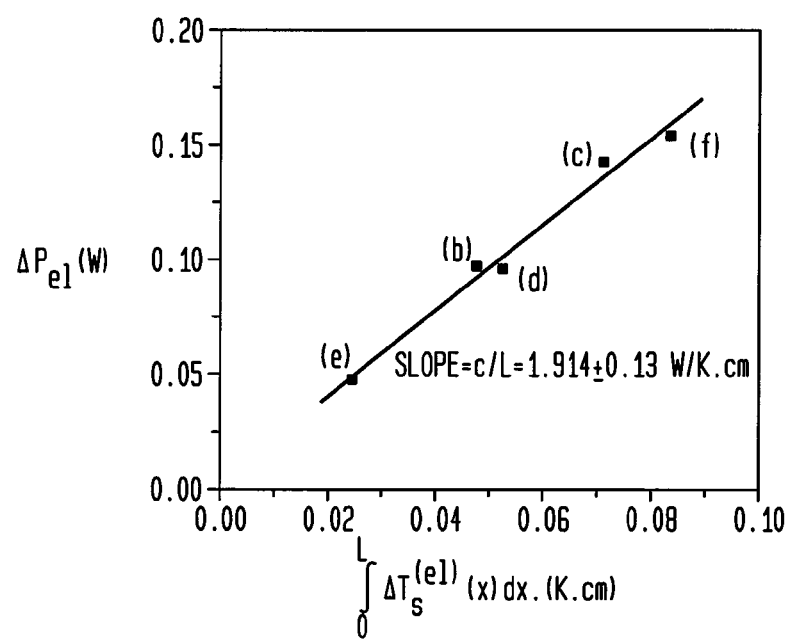
FIG. 12 shows a plot of modulated electrical power versus integrated change in surface temperature for the SOAs of the PIC shown in FIG. 11, FIG. 13A schematically depicts a PIC having a plurality of SOAs arranged in a Mach-Zehnder interferometer configuration.

The value of modulated electrical power versus the integrated change in surface temperature (right hand side of Eq. (4) above) is plotted in FIG. 12. In the plot, each data point corresponds to one of the SOAs. The slope of a linear fit to the data, which is a measure of c/L in the above Eq. (4), has a value of 1.914±0.13 W/K·cm. The fact that electrical power changes linearly with the change in surface temperature when considering all the SOAs indicates that the SOA elements have similar values of $Z_T$, and $A_{eff}$·h per unit length. The thermal images obtained by electrical modulation of the SOAs can be used not only for quantifying the electrical heating of the individual circuit elements, but also as a diagnostic tool for performance testing and failure analysis of the device even before fiber coupling of the chip.

EXAMPLE 2

Figure 13A:
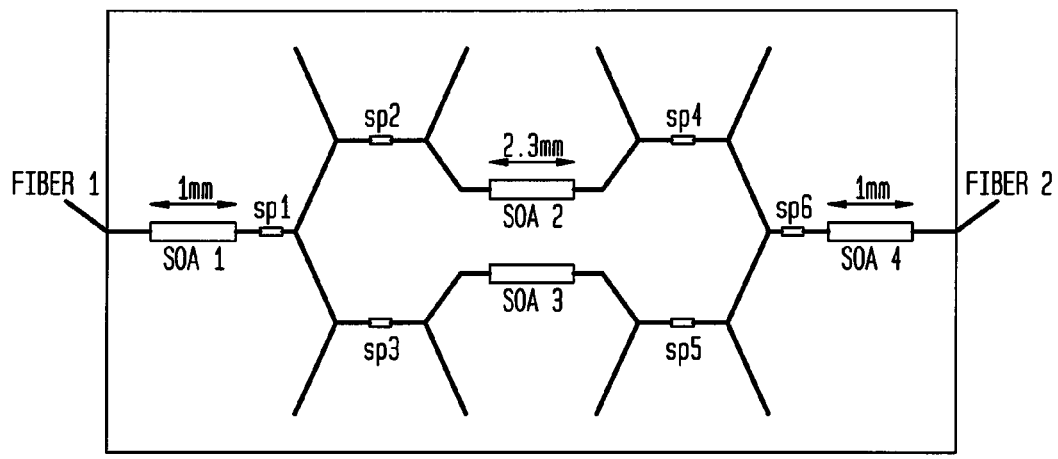
FIG. 13B presents plots corresponding to thermal profiles of SOA1 of the PIC shown in FIG. 13A for two different injected optical powers.

In another set of experiments, a PIC device having 10 SOAs was utilized. The SOAs, which were relevant to the measurements discussed below, are shown in FIG. 13A and are labeled as SOA1, SOA2, SOA3, and SOA4. A number of waveguide splitters (labeled as sp1-sp6) are also depicted. The SOAs and splitters are arranged in a Mach-Zehnder interferometer (MZI) structure, with SOA1 and SOA4 coupled to input and output fibers 1 and 2, respectively.

Figure 13B:
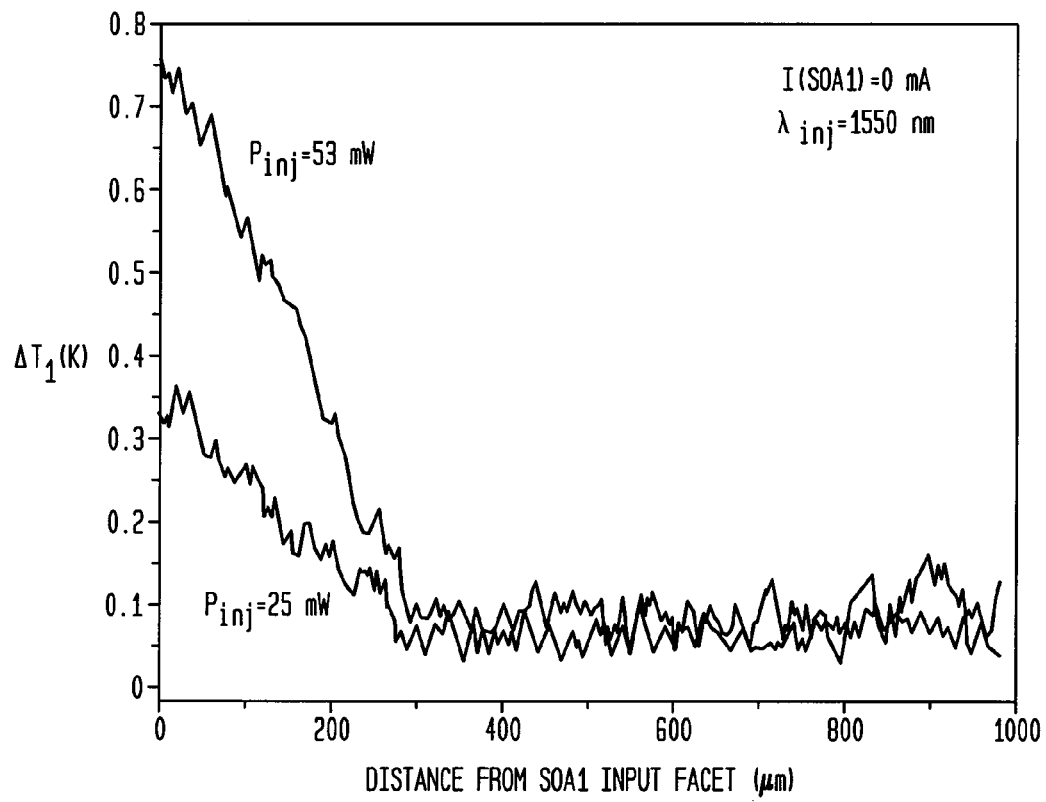

Thermoreflectance imaging was employed to measure the fiber-coupling losses into and out of the PIC. To measure the coupling loss of fiber 1, SOA1 was kept unbiased ($I_1$=0 mA) so that it would act as an absorber. Injection of a high power optical signal through the fiber to SOA1 causes heating near the input of the SOA due to light absorption, which decreases along the length of SOA1. FIG. 13B shows the thermal profile of SOA1 along the length of its waveguide ridge at two different input optical powers of 25 mW and 53 mW for radiation at a wavelength of 1550 nm injected into the fiber. The total change in radiated power ($\Delta P_{rad}^{(t)} = \Delta P_{out} - \Delta P_{in}$) can be obtained by integrating the thermal profiles of FIG. 13B along the length of the SOA, using the above Eq. (5) with a value of $$\frac{c}{L} = 0.728 \text{ W/K·cm}$$

for SOA1, which was measured by the electrical heating technique discussed above in connection with Example 1. Given $\Delta P_{rad}^{(t)}$, the optical power at the input facet of SOA1 after fiber-coupling loss, $\Delta P_{in}$, can be estimated by taking $\Delta P_{out}$ to be negligible. From the thermal profiles in FIG. 13B, the optical powers into SOA1 after coupling loss were derived as: $\Delta P_{in}$=14.7 mW and 27.3 mW for two injected optical powers into the fiber of 25 mW and 53 mW, respectively. Thus, the coupling loss for fiber 1 was estimated to be about 2.3 dB corresponding to 25 mW input power and about 2.9 dB corresponding to 53 mW input power, yielding an average loss of about 2.6 dB. Utilizing the same methodology, the coupling loss of fiber 2 was estimated to be about 2 dB.

It should be noted that the fiber-coupling loss to the chip can also be estimated by measuring the photocurrent of SOA1. However, the value of loss obtained in this way gives only an upper bound for the coupling loss as only a fraction of absorbed photons give rise to the measured photocurrent. For this chip, photocurrent measurements yielded an upper bound of about 7 dB for the fiber coupling losses. The thermal imaging technique discussed above, however, provides more accurate values for the coupling losses.

EXAMPLE 3

Figure 14A:
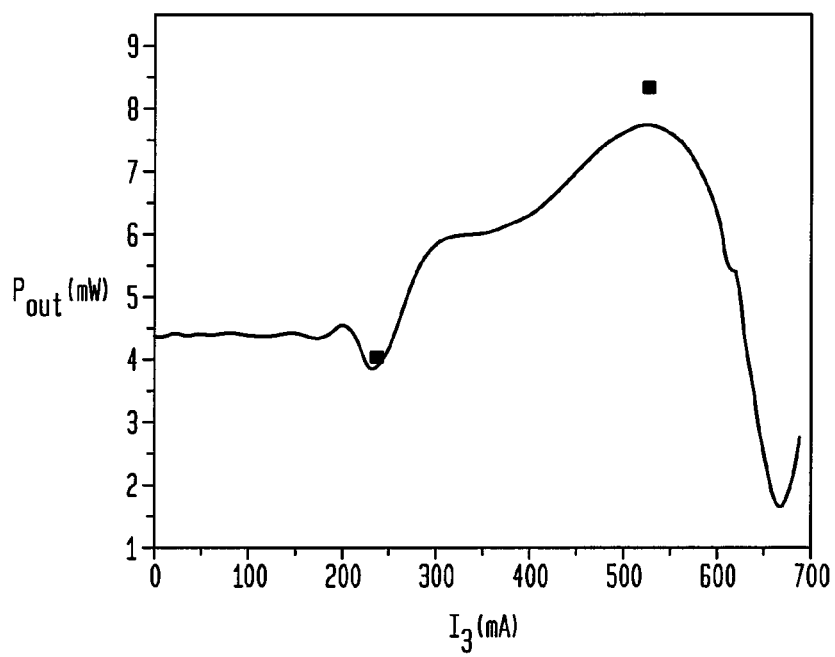
FIG. 14A shows the output power of the PIC shown in FIG. 13A as a function of varying bias current applied to SOA3.

By way of illustration, thermoreflectance imaging was used to map the optical power distribution the PIC shown in FIG. 13A, which as noted above comprises a SOA Mach-Zehnder interferometer (SOA-MZI). In this configuration, SOAs 2 and 3 act as the interferometer arms, and SOA1 and SOA4 as input and output amplifiers, respectively. With DC optical power injection into the chip, FIG. 14A shows that the output optical power from the MZI exhibits the characteristic constructive and destructive interference peaks as the phase of the light in one arm of the interferometer is varied. The results shown in FIG. 14A were obtained by applying a fixed electrical bias to SOAs 1, 2 and 4, while the DC bias current ($I_3$) to SOA3 was varied from 0 to about 700 mA. Since SOAs are highly non-linear devices, changing 13 causes a phase difference between the two arms of the interferometer, resulting in the interference minima and maxima in FIG. 14A, respectively.

Thermal imaging was used to map the optical power distribution throughout the MZI at both an interference maximum and minimum. In these measurements, SOAs 1, 2, and 4 were biased at the same fixed currents indicated above in connection with FIG. 14A. SOA3 was biased at $I_3$=240 mA at the destructive interference minimum and at $I_3$=524 mA at the constructive interference condition. An input optical signal of 1.2 mW at a wavelength of 1550 nm applied to the MZI was modulated at 15 Hz using an optical chopper. The finite element energy balance model yields a spatial optical power distribution as follows:

$$\Delta P_{rad}(x) = \Delta P_{out}(x) - \Delta P_{in}(x) = -\frac{c}{L}\Delta T_s^{(opt)}(x) \qquad \text{Eq. (7)}$$

Figure 14B:
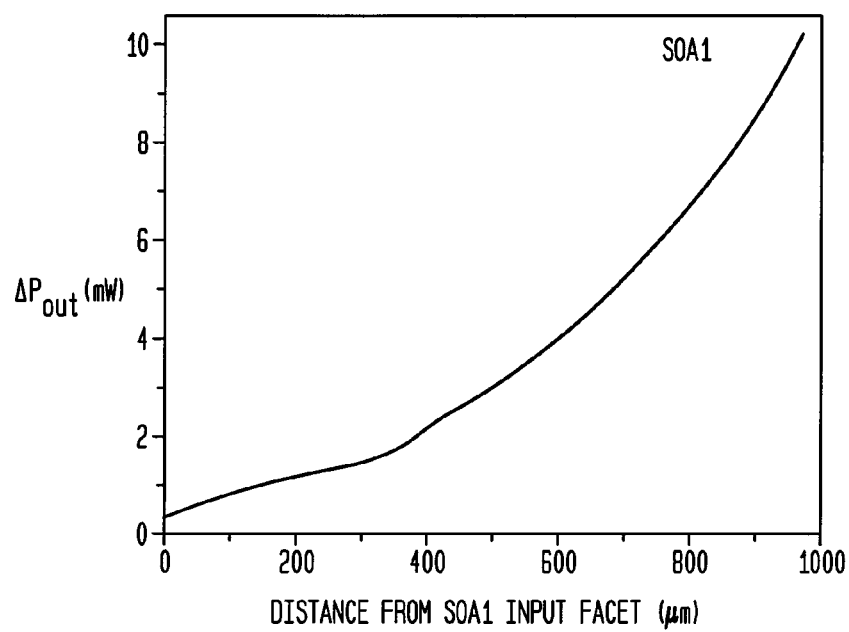
FIG. 14B shows the output power of SOA1 in the PIC depicted in FIG. 13A as a function of distance from SOA1 input facet for a bias current of 200 mA.
Figure 14C:
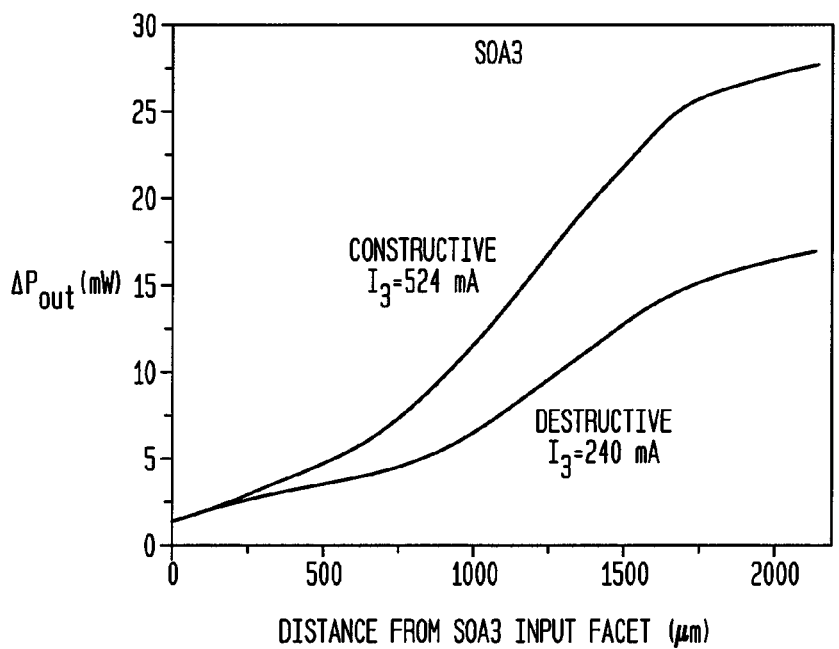
FIG. 14C shows the output power of SOA3 in the PIC depicted in FIG. 13A as a function of distance from SOA3 input facet for two different bias currents.

The above Eq. (7) can be used to extract the output power values of each SOA at both interference conditions. As the energy is carried away by photons through the amplifying process along the length of the SOA under test in this experiment, the surface temperature decreases and an optical cooling is observed in the temperature profiles. FIG. 14B shows the experimentally obtained spatial optical power distribution in the input SOA (i.e., SOA1). Utilizing Eq. (5), the output power of the SOA1 was determined to be about 10.2 mW. FIG. 14C shows the spatial optical power distribution in SOA3 for the two bias conditions. As expected, the optical power in SOA3 is higher at the greater bias current. The input power to SOA3 was estimated from the output power of SOA1 after passing through two waveguide splitters (sp1 and sp3 shown in FIG. 13A) and assuming a 5 dB loss in each splitter. The output optical powers from SOA3 were estimated to be about 27.8 mW and 16.9 mW for the two bias conditions. A similar analysis of the other arm of the MZI (SOA2), which was biased at 500 mA, yielded an output power of about 31 mW at its output facet.

Figure 14D:
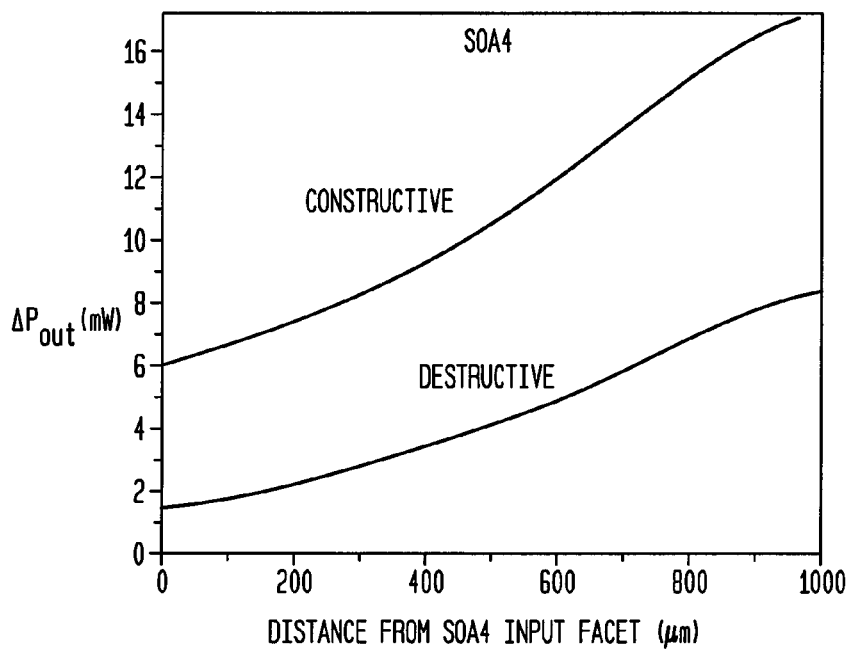
FIG. 14D shows the output power of SOA4 in the PIC depicted in FIG. 13A as a function of distance from SOA4 input facet for two different bias currents.

The optical signals from the two MZI arms after passing through splitters sp4, sp5 and sp6, each of which is assumed to have a 5 dB loss, were injected to the MZI output amplifier SOA4. FIG. 14D shows the optical power distribution in this SOA at both constructive and destructive interference conditions ($I_3$=524 mA and 240 mA, respectively). From FIG. 14D, the optical power at the output of SOA4 was calculated to be 16.75 mW and 7.97 mW for the two interference conditions. After taking into account the 3 dB coupling loss of the output fiber, the chip output optical powers estimated entirely based on surface thermal profiling were 8.4 mW and 3.9 mW at the constructive and destructive interference conditions, respectively. These results are shown as squares in FIG. 14A. As can be observed from FIG. 14A, there is a close agreement between the optically measured MZI power and the optical power derived entirely from thermal imaging, with no access to the optical output of the chip.

EXAMPLE 4

As noted above, in some embodiments, the methods of the invention can be utilized to optically characterize circuit elements (e.g., PICs) at the wafer stage, prior to packaging and fiber-coupling. For example, modulation of amplified spontaneous emission (ASE) from a cascaded SOA on a chip can be used as the optical source to probe the radiative heating or cooling response of the other integrated elements on the chip. By way of example, such a method can be used as a diagnostic tool for catastrophic failure analysis of a PIC as well as for extracting material parameters such as modal gain. As discussed above, such a method can be utilized in some cases in conjunction with photocurrent measurements.

In this example, the exemplary PIC shown in FIG. 5A having six cascaded SOAs was employed. The performance of SOA1 was characterized without accessing any of the input or output optical fibers by electrically modulating the ASE from SOA2. This modulated ASE was injected into SOA1 via the integrated waveguide, eliminating the need for a modulated external optical source. SOA1 was electrically biased at a DC level of 240 m. As the input light injected from SOA2 was amplified, optical cooling of about 0.1 K along the length of SOA2 was observed as shown in FIG. 5B.

In order to demonstrate the feasibility of utilizing the technique for fiber-free diagnosis of catastrophic failure of a cascaded device, the temperature profile of a damaged SOA on another chip having the same layout as that shown in FIG. 5A was also measured (SOA1 was the damaged SOA). FIG. 5C shows the measured temperature profile, which indicates the lack of optical cooling along the length of SOA1. The lack of optical cooling confirms that no amplification occurs in this SOA because the SOA1 or the respective waveguide interconnect is damaged.

Figure 15A:
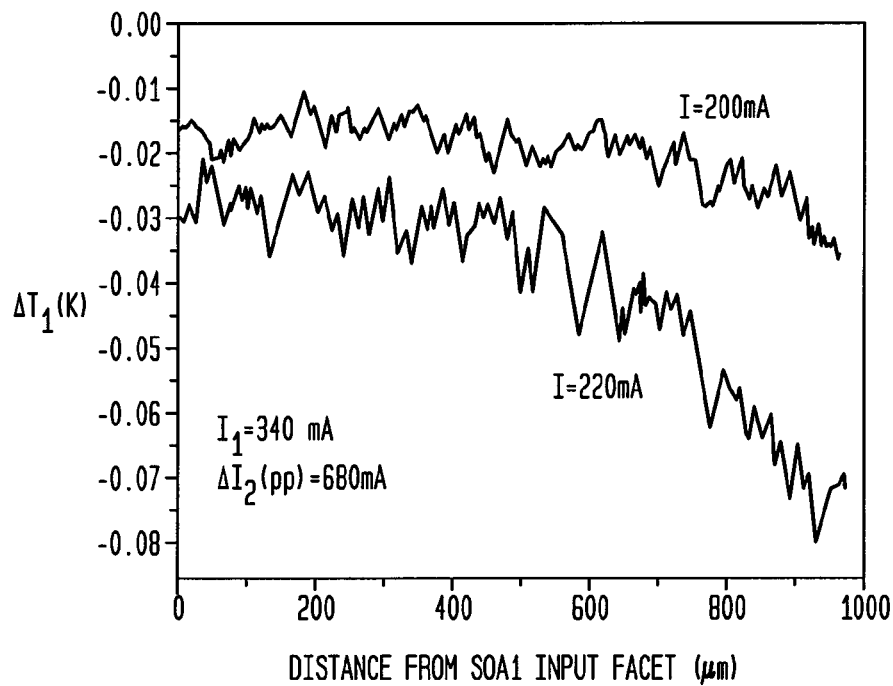
FIG. 15A shows a temperature profile along the ridge of SOA1 shown in FIG. 13A, biased at 200 mA and 220 mA, using modulated ASE of SOA2 as the light source.

In addition to diagnosing catastrophic failures, this fiber-free technique can also quantify material parameters of cascaded devices. By way of example, fiber-free thermoreflectance imaging was employed to quantify the broadband gain per unit length of SOA1 in a PIC having the layout shown in FIG. 5A (this was an undamaged functioning chip). The performance of the SOA1 was characterized, without accessing any of the input or output optical fibers, by electrically modulating the ASE from SOA2. This modulated ASE was injected into SOA1 via the integrated waveguides and splitters (sp1 and sp2). SOA1 was electrically biased at a fixed dc level and the bias current to SOA2 was modulated by $\Delta I = \pm 340$ mA around a dc level of 340 mA. As the input ASE light injected from SOA2 into SOA1 was amplified along the length of SOA1, optical cooling due to the emitted photons was expected. FIG. 15A shows the thermal profiles of SOA1 along the length of its waveguide ridge, biased at 200 mA and 220 mA, where a cooling of about 80 mK was observed at the output facet of SOA1 for a bias current of 220 mA.

Figure 15B:
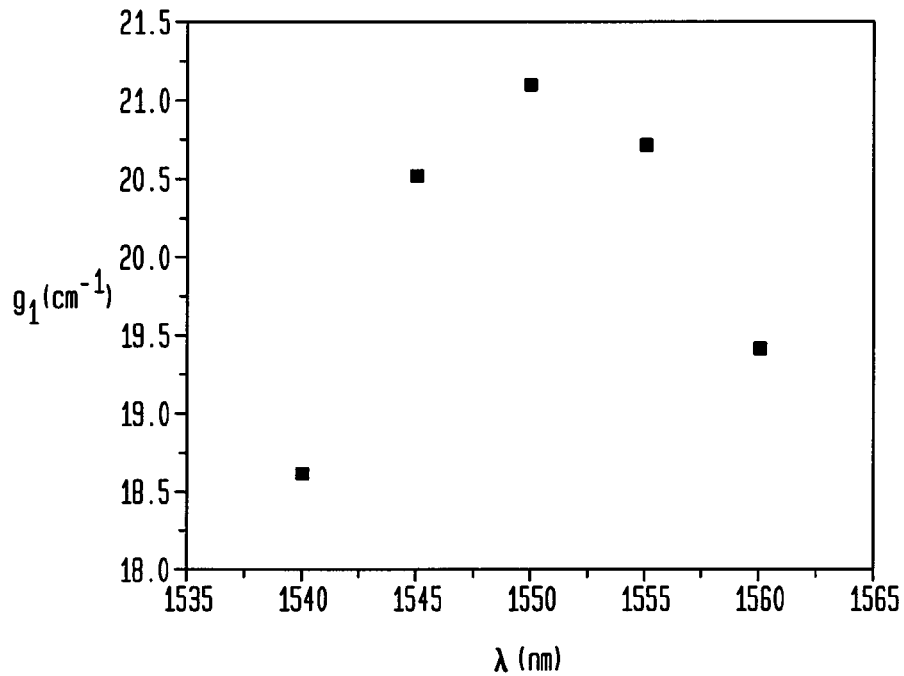
FIG. 15B shows the narrowband material gain of SOA1 shown in FIG. 13A at a bias current of 220 mA for different wavelengths of the injected light.

The finite energy balance model of Eq. (3) above was used to extract the material gain per unit length of SOA1 from the temperature profile of FIG. 15A. From an exponential fit in the form of $\Delta P_{out}(x) = \Delta P_{in} e^{gx}$, where g represents the modal gain of SOA1 corresponding to the broadband ASE injection, a value of $g=16.9$ cm$^{-1}$ was estimated for $I_1$=200 mA and a value of $g=20.5$ cm$^{-1}$ was estimated for $I_1$=220 mA. For confirmation of these results, the single-wavelength, narrow modal gain of SOA1 at 220 mA was also measured at five different wavelengths, ranging from 1540 nm to 1560 nm, by injecting a narrowband optical signal from an external light source. Using the same exponential fit for ($\Delta P$), the measured values for the narrowband gain are plotted as a function of wavelength in FIG. 15B. From this data, a spectrally averaged modal gain value of $<g>=20.08$ cm$^{-1}$ was obtained, which is very close to the broadband gain value of 20.5 cm$^{-1}$ obtained from the ASE measurement. Hence, the efficacy of utilizing the ASE of an on-chip SOA as an optical probe to analyze other cascaded devices, including extracting various material parameters of those devices, without requiring access to the optical input and output fibers was demonstrated.

EXAMPLE 5

As noted above, in some embodiments of the invention, thermal profile of one or more devices (e.g., SOAs) can be obtained, e.g., while electrical bias (e.g., a bias current) is applied to the devices, and the profile can be utilized to characterize the device. For example, the temperature profile measured for a device can be compared with an expected profile for a similar device that is functional (e.g., with a reference profile previously obtained for a similar device that was known to be functional) to determine whether or not the device under testing is faulty.

Thermoreflectance microscopy was used to obtain two-dimensional surface temperature images of both a single SOA and a PIC comprising cascaded SOAs. A blue LED (λ=467 nm) was utilized as the illumination source and a 12 bit, 60 Hz CCD camera was used as the detector. The single SOA was electrically pumped, with no light injection, resulting in Joule heating along its ridge. The SOA bias current was sinusoidally modulated at a frequency (f) of 10 Hz, and the camera trigger was phase locked to the first harmonic of the current modulation. The resulting Joule heating of the device is proportional to the electrical power ($P_{el}$):

$$P_{el} = (I_0 + I_1 \exp[i2\pi ft])(V_0 + V_1 \exp[i2\pi ft]) = \qquad \text{Eq. (8)}$$
$$P_0 + (I_0 V_1 + I_1 V_0)\exp[i2\pi ft] + 2^{nd} \text{ harmonic}$$

Figure 16A:
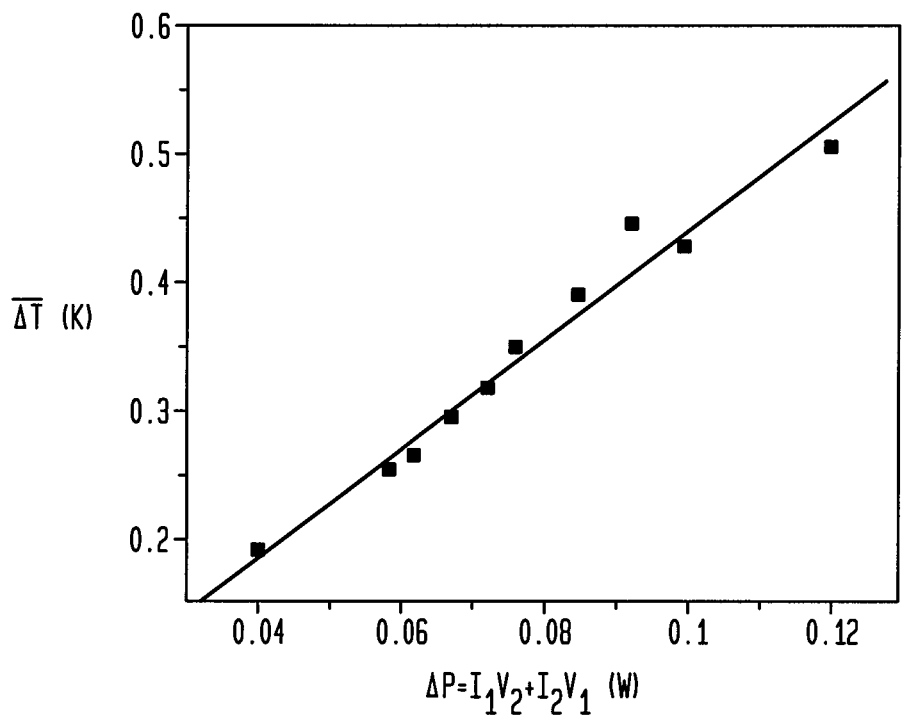
FIG. 16A shows average change in temperature across a ridge of an SOA as a function of change in electrical power.
Figure 16B:
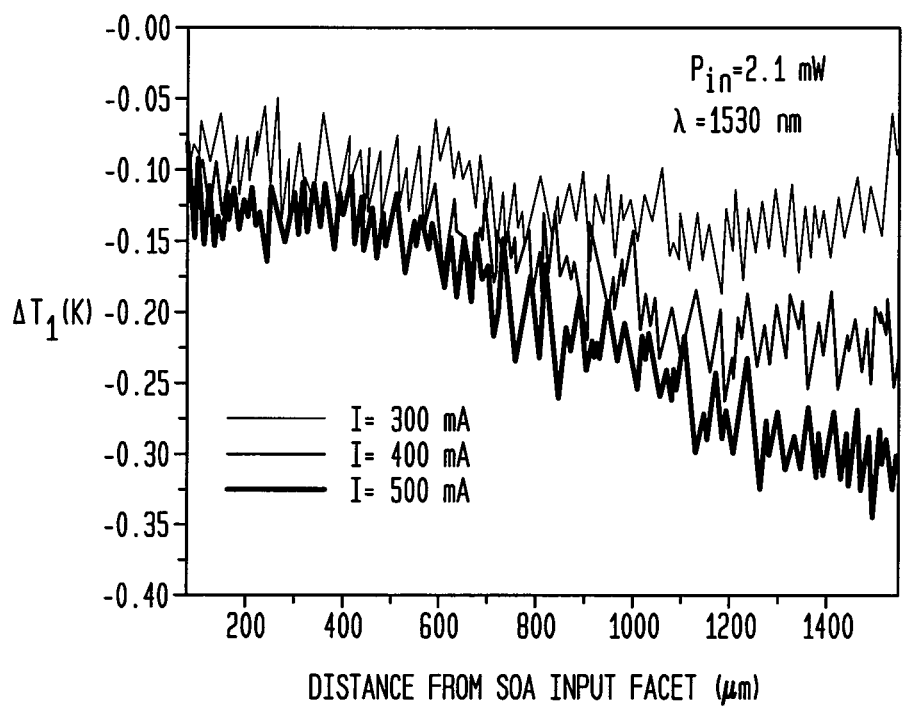
FIG. 16B shows surface cooling along the length of the SOA to which FIG. 16A refers as a result of optical amplification for three different bias currents, FIG. 17A schematically depicts a PIC having a plurality of SOAs.

FIG. 16A depicts average change in temperature measured across the SOA ridge as a function of change in electrical power (data points shown by solid squares were measured with a fixed DC current level $I_0$ of 97 mA and the solid circles were measured with a fixed modulation depth $I_1$ of 50 mA). FIG. 16B) shows surface cooling along the length of the SOA as a result of optical amplification for three different bias currents: 300 mA, 400 mA, and 500 mA. The measurements depicted in FIGS. 16A and 16B were made with the heat sink temperature actively controlled at 20° C.

EXAMPLE 6

Figure 17A:
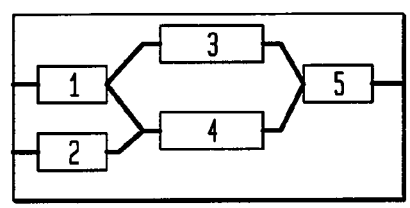
FIG. 17B shows I-V curves for SOA3, SOA4 and SOA5 of the PIC shown in FIG. 17A.
FIG. 17C shows the temperature profile across the ridge of working SOA5 of the PIC depicted in FIG. 17A, which was electrically biased at its optimum operating current (no light was injected into the SOA)
FIG. 17D shows the temperature profile across the ridge of damaged SOA4 of the PIC depicted in FIG. 17A, which was electrically biased at its optimum operating current (no light was injected into the SOA).
Figure 17B:
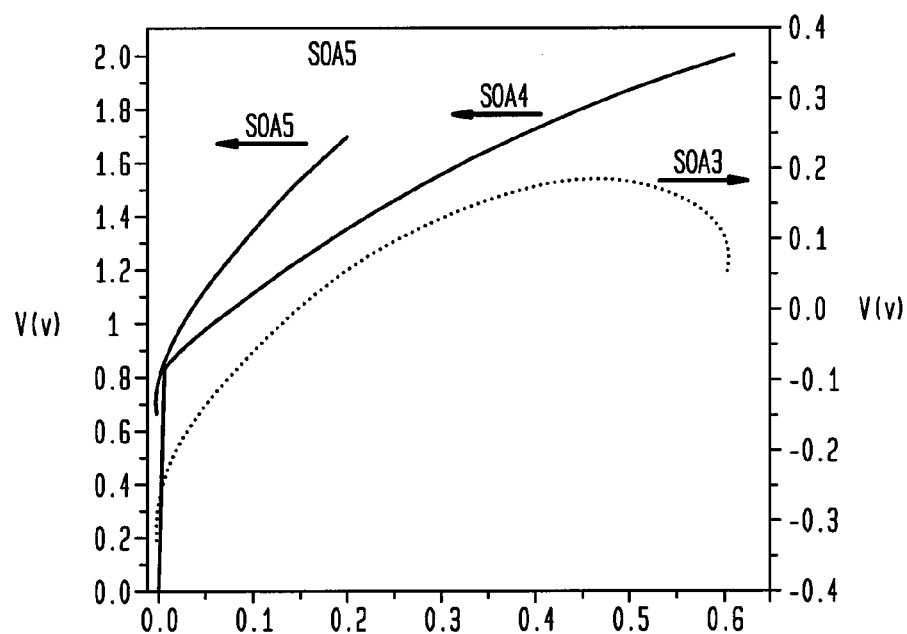

Thermoreflectance imaging was used to test the performance of individual devices in a dysfunctional test PIC. The chip included 5 cascaded SOAs arranged in an interferometer configuration, as shown schematically in FIG. 17A. Conventional optical testing of this PIC revealed that a light signal injected at the input to SOA1 or SOA2 was not emitted at the PIC output from SOA5. Furthermore, no change was observed in the magnitude of the amplified spontaneous emission emitted from the PIC as the bias currents to SOA3 and SOA4 were varied, suggesting that both SOA3 and SOA4 were damaged. However, IV curves for the SOA3, SOA4 and SOA5, shown in FIG. 17B, identified only SOA3 as faulty.

Figure 17C:
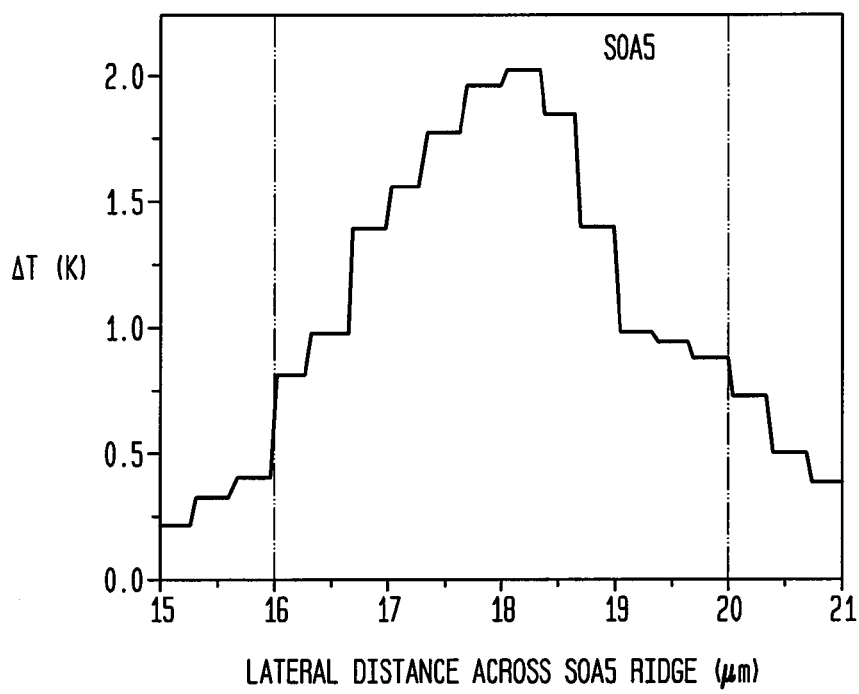
Figure 17D:
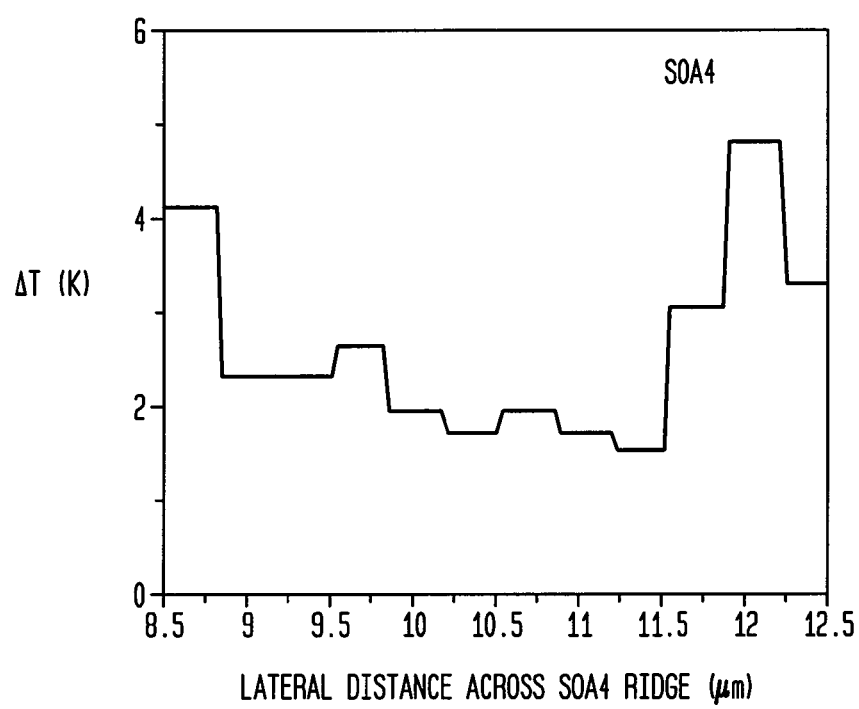

Utilizing the thermoreflectance imaging, lateral temperature profiles across the ridges of SOA4 and SOA5 on the chip were observed when these devices were biased at their optimal operating currents, with no light injected into the PIC. As shown in FIG. 17C, in SOA5 lateral heat spreading was observed. However, FIG. 17D shows that SOA4 is dysfunctional as no signature of Joule heating across the ridge was observed, and a similar result was obtained for SOA3. Hence, the thermoreflectance imaging technique correctly identified the faulty SOA3 as well as diagnosed a problem in SOA4, which was not observable by traditional techniques.

All U.S. patents and published patent applications as well as non-patent references to which this application refers (including those in the appendices) are herein incorporated by reference. Published International Patent Application WO 03/052366 entitled "Thermoreflectance Microscope For Measuring An Integrated Circuit Temperature" is also herein incorporated by reference. Further, the following publications are herein incorporated by reference in their entirety: "Fiber-free characterization of photonic integrated circuits by thermoreflectance microscopy," by Maryam Farzaneh, Rajeev Ram, and Janice A. Hudgings published in *Proceedings of the Conference on Lasers and Electrooptics* 2007, Baltimore, Md., May 2007; "Thermal profiling of photonic integrated circuits by thermoreflectance microscopy," by Maryam Farzaneh, Dietrich Luerssen, and Janice A. Hudgings, published in *Proceedings of the Conference on Lasers and Electrooptics* 2006, Long Beach, Calif., May 2006.

It should be understood that features discussed in connection with one embodiment can be utilized in and/or combined with features of other embodiments and such variations are within the scope of the invention. For example, the energy balance model discussed in detail in connection one embodiment can also be utilized in other embodiments.

Those having ordinary skill in the art will appreciate that various changes to the embodiments can be made without departing from the scope of the invention.

The invention claimed is:

1. A method of profiling of a photonic integrated circuit having an input port for coupling said integrated circuit to an optical fiber, comprising
    applying a varying optical input signal, via the optical fiber, to said input port of the circuit so as to modulate temperature of one or more elements of the circuit,
    obtaining a thermal profile of said one or more elements via a non-contact thermal measurement modality utilizing lock-in detection at a modulating frequency of said varying optical input signal, and
    utilizing said thermal profile to determine an optical loss associated with a coupling between said input port and the fiber.

2. The method of claim 1, wherein the step of obtaining a thermal profile comprises performing a thermoreflectance measurement.

3. The method of claim 1, wherein the step of obtaining a thermal profile comprises detecting thermal radiation emitted by said one or more elements.

4. The method of claim 1, wherein the step of obtaining a thermal profile comprises employing spectral shifts in emitted spontaneous or stimulated emission.

5. The method of claim 1, wherein the step of obtaining a thermal profile comprises employing a scanning probe thermography.

6. A method of profiling of a photonic integrated circuit having an output port for coupling to an optical fiber for receiving output radiation from said circuit, comprising
    applying a varying optical input signal to said circuit so as to modulate temperature of one or more elements of the circuit,
    obtaining a thermal profile of said one or more elements via a non-contact thermal measurement modality utilizing lock-in detection at a modulating frequency of said varying optical input signal, and
    utilizing said thermal profile to determine an optical loss associated with a coupling between said output port and the fiber.

7. The method of claim 6, wherein the step of obtaining the thermal profile comprises performing a thermoreflectance measurement.

8. The method of claim 6, wherein the step of obtaining a thermal profile comprises employing spectral shifts in emitted spontaneous or stimulated emission.

9. The method of claim 6, wherein the step of obtaining the thermal profile comprises utilizing an infrared camera to detect thermal radiation emitted by said one or more elements.

10. The method of claim 6, wherein the step of obtaining the thermal profile comprises employing scanning probe thermography.

11. A method of profiling of a photonic integrated circuit, comprising
applying a varying optical input signal to said circuit so as to modulate temperature of one or more elements of the circuit,
obtaining a thermal profile of said one or more elements via a non-contact thermal measurement modality utilizing lock-in detection at a modulating frequency of said varying optical input signal, and
utilizing said thermal profile to predict an optical output power of said circuit in response to an applied input power.

12. The method of claim 11, wherein the step of obtaining the thermal profile comprises performing a thermoreflectance measurement.

13. The method of claim 11, wherein the step of obtaining a thermal profile comprises employing spectral shifts in emitted spontaneous or stimulated emission.

14. The method of claim 11, wherein the step of obtaining the thermal profile comprises utilizing an infrared camera to detect thermal radiation emitted by said one or more elements.

15. The method of claim 11, wherein the step of obtaining the thermal profile comprises employing scanning probe thermography.

* * * * *